US012800364B2

(12) United States Patent
Mcclure et al.

(10) Patent No.: US 12,800,364 B2
(45) Date of Patent: Nov. 17, 2026

(54) APPARATUS AND METHODS FOR OPEN CHANNEL FLOW MEASUREMENT OF PROCESS FLUIDS

(71) Applicant: Spartan Controls Ltd., Calgary (CA)

(72) Inventors: Kenneth Mcclure, Vancouver (CA); Michel Windle, Calgary (CA)

(73) Assignee: Spartan Controls Ltd., Calgary (CA)

( * ) Notice: Subject to any disclaimer, the term of this patent is extended or adjusted under 35 U.S.C. 154(b) by 325 days.

(21) Appl. No.: 18/428,019

(22) Filed: Jan. 31, 2024

(65) Prior Publication Data

US 2024/0255326 A1 Aug. 1, 2024

(30) Foreign Application Priority Data

Jan. 31, 2023 (CA) .................................... 3188132

(51) Int. Cl.
*G01F 1/002* (2022.01)
*G01F 23/00* (2022.01)

(52) U.S. Cl.
CPC .......... *G01F 1/002* (2013.01); *G01F 23/0007* (2013.01)

(58) Field of Classification Search
CPC ............................ G01F 23/0007; G01F 1/002
USPC ........................................................... 73/861
See application file for complete search history.

(56) References Cited

FOREIGN PATENT DOCUMENTS

KR 20100098360 A * 9/2010 ............ G01F 23/26

OTHER PUBLICATIONS

Translation of KR-20100098360-A (Year: 2010).*

* cited by examiner

*Primary Examiner* — Nathaniel T Woodward
(74) *Attorney, Agent, or Firm* — Reichel Stohry Dean LLP; Natalie J. Dean

(57) ABSTRACT

Disclosed herein are apparatuses and methods related to open channel flow measurement of process fluids. In certain embodiments the apparatus has a collection trough to receive the process fluid from a unit process, baffles to slow the flow of the process fluid to subcritical flow, and a measurement channel. A level measuring system is connected to the measurement channel and can determine the height of the process fluid in the measurement channel. The flow of the process fluid can be inferring using the height of the process fluid in the measurement channel along with other process variables. Methods are also disclosed, including methods to adjust flow conditions in the measurement channel in order to verify accuracy of the inferred flow rate. The inferred flow rate may be used to control process variables in other downstream or upstream processes, including through application in a broader control schema.

18 Claims, 6 Drawing Sheets

APPARATUS AND METHODS FOR OPEN CHANNEL FLOW MEASUREMENT OF PROCESS FLUIDS

INTRODUCTION

The present disclosure relates to industrial processes, and in particular to open channel flow measurement of process fluids.

BACKGROUND

In industrial processes, such as chemical plants or ore processing plants, it is often necessary to measure the mass or volumetric flow rate of various fluids. In most industrial processes flow rates are measured in closed channel flow, and moreover many flow meters, such as Coriolis meters or vortex flow meters, are only practical to operate in closed channel flow.

Open channel flow offers certain advantages because, as compared to closed channel flow, an open channel can require less material and/or process equipment, permit visual inspection of the fluid flow and channel condition, and facilitate cleaning or flushing of the flow channel. These advantages are particularly useful where the process fluid is abrasive or contains a suspended sediment load, as damage to the channel may be easily identified and the channel can be flushed of debris as required. That said, there are certain difficulties when measuring flow rates in open channel flow, such as, for example, a potentially greater entrainment of vapor in the process fluid which, in turn, may lead to difficulty in accurate measurement.

Accordingly, an apparatus and method that can accurately measure process fluid flow rates through flow channels open to atmospheric conditions remain highly desirable.

SUMMARY OF INVENTION

According to one embodiment, there is provided an apparatus for supporting inferential measurement of open channel flow of a process fluid, the apparatus having: a collection trough adapted to receive the process fluid from a unit process; a measurement channel adapted to receive the process fluid from the collection trough, the measurement channel having a bottom at a substantially consistent angle with ground; one or more baffles connected to the measurement channel, the one or more baffles adapted to adjust the velocity of the process fluid to sub-critical flow; and a level measuring system connected to the measurement channel downstream of the one or more baffles, the level measuring system adapted to send and receive one or more signals through the process fluid in the measurement channel to determine the depth of the process fluid.

According to a further embodiment there is provided a method of measuring open channel flow of a process fluid, the method including the steps of: collecting a flow of the process fluid from a unit process by a collection trough; directing the process fluid to one or more baffles; contacting the process fluid with the one or more baffles to reduce the velocity of the process fluid to sub-critical flow; directing the process fluid to a measurement channel; measuring the depth of the process fluid in the measurement channel by a level measuring system; and inferring the flow rate of the process fluid by a correlation algorithm using the depth of the process fluid in the measurement channel and an angle of the bottom of the measurement channel relative to ground.

BRIEF DESCRIPTION OF THE DRAWINGS

Specific embodiments of the invention will now be described, by way of example only, with the use of drawings in which.

It will be noted that throughout the appended drawings, like features are identified by like reference numerals.

DESCRIPTION OF SPECIFIC EMBODIMENT

Embodiments are described below, by way of example only, beginning with reference to FIGS. 1-3.

Figure 1:
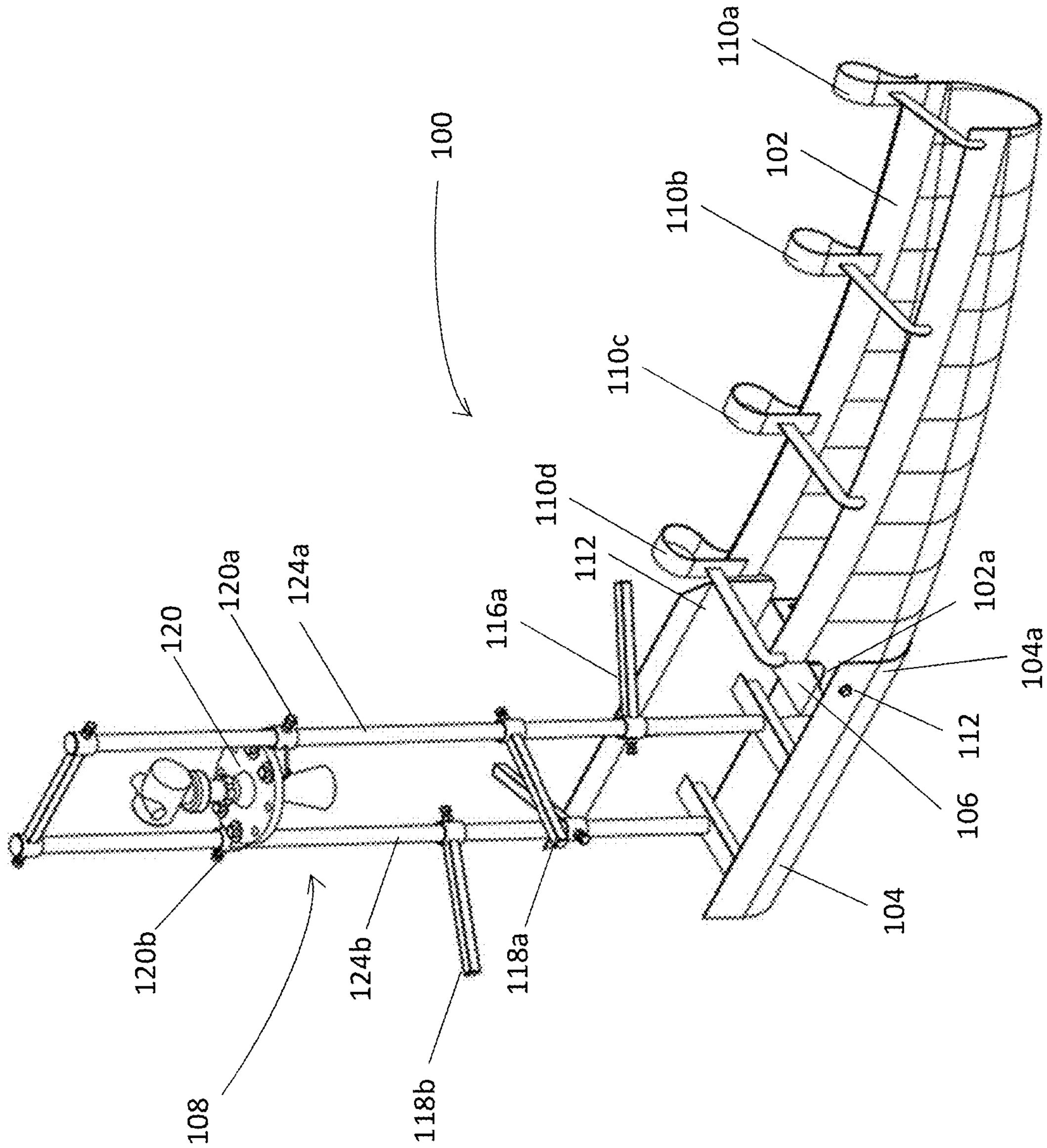
FIG. 1 shows an elevation view of an apparatus for supporting inferential measurement of open channel flow of process fluids according to one embodiment.
Figure 2:
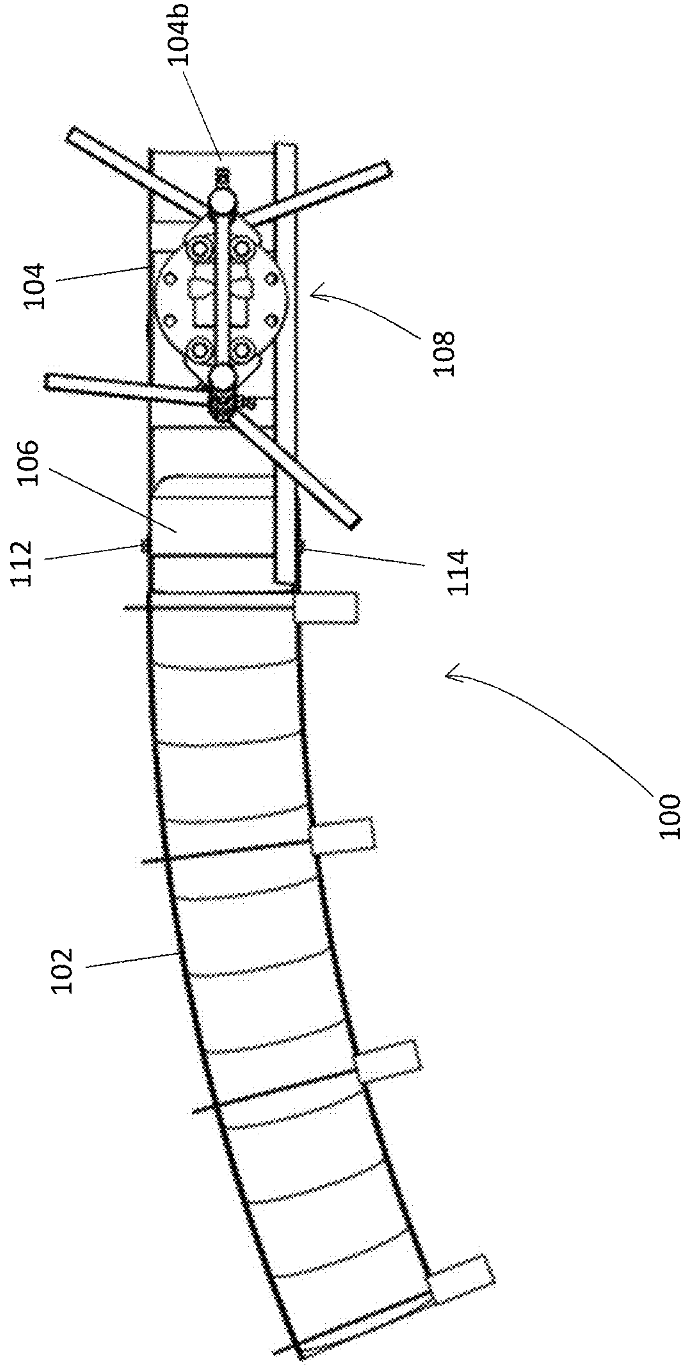
FIG. 2 shows a top view the apparatus of FIG. 1.
Figure 3:
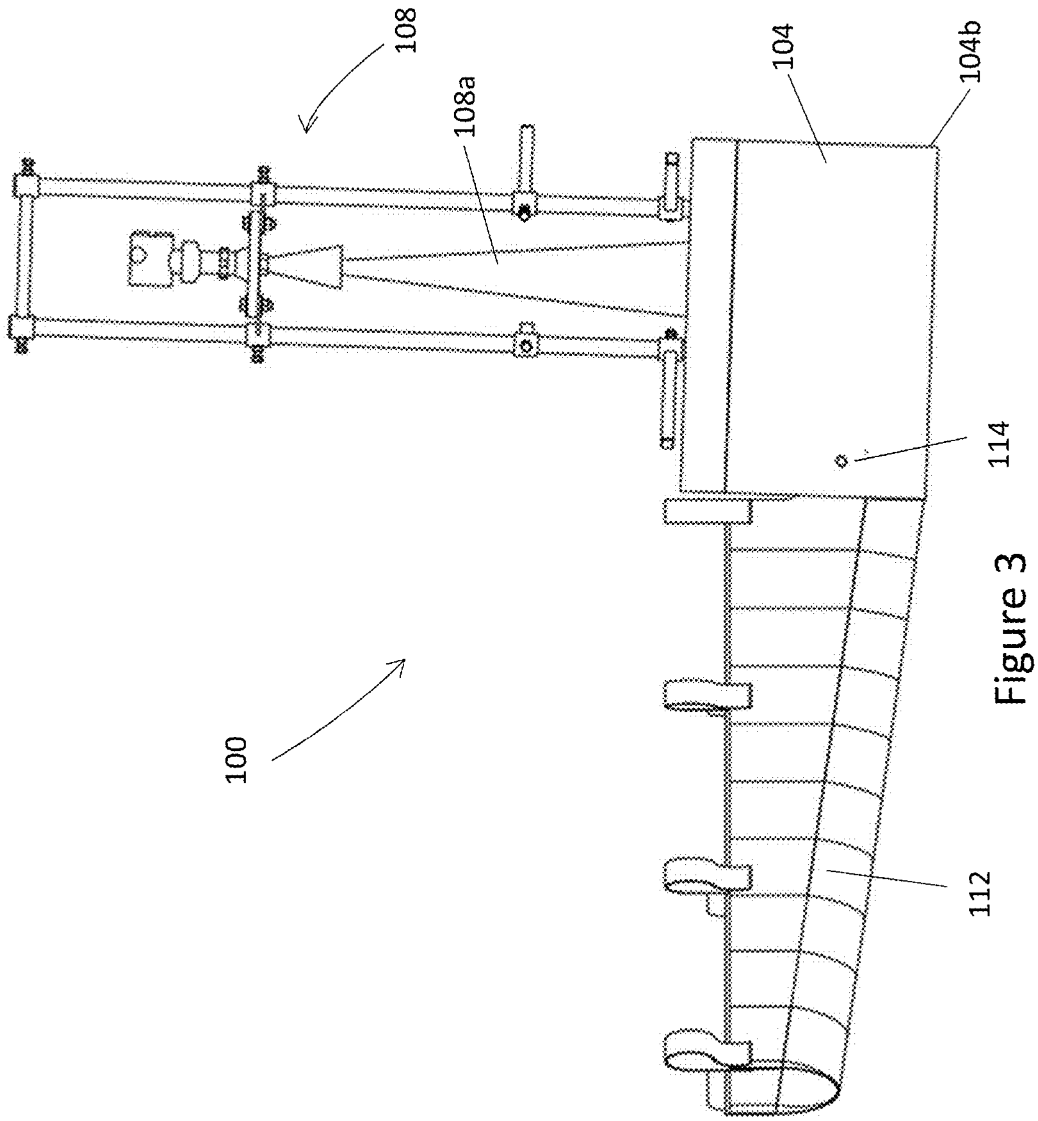
FIG. 3 shown side view of the apparatus of FIG. 1.

FIGS. 1-3 show different views of an apparatus 100 for supporting inferential measurement of open channel flow of process fluids. FIG. 1 shows an elevation view of the apparatus 100, FIG. 2 shows a top view of the apparatus 100, and FIG. 3 shows a side view of the apparatus 100.

The apparatus 100 generally has a collection trough 102, a measurement channel 104, a set of one or more baffles 106 and a level measuring system 108.

The collection trough 102 receives process fluid from a unit process. A unit process could include any industrial process where process fluid is ejected, for example, a potash or bitumen flotation tank cell where process fluid overflows from an edge of the flotation tank cell. The collection trough 102 is connected to the measurement channel 104 so as to permit process fluid received by the collection trough to be conveyed to the measurement channel. In FIG. 1 the collection trough 102 includes clips and/or hooks 110*a*, 110*b*, 110*c*, 110*d* which allow the connection trough to selectively connect to the edge of the unit process. Other methods of connecting the collection trough 102 to the unit process are also possible and would be readily envisioned by a skilled person. Embodiments where the apparatus 100 is selectively connected to a unit process may be particularly advantageous as the apparatus can be installed and/or removed without the need to effect a shutdown the unit process. The collection trough 102 in FIG. 1 is curved, which can be most easily seen with reference to FIG. 2. Curvature of the collection trough 102 may help the collection trough be better supported by the unit process and/or take up less space in the process environment. Other shapes of the collection trough 102 are possible based on the process environment or flow characteristics.

The baffles 106 are connected to the measurement channel 104. Process fluid entering the collection trough 102 can flow at critical or super-critical flow, particularly where the process fluid flow is high relative to the size of the collection trough and/or where the angle of the collection trough is steep relative to ground. The baffles 106 contact process fluid entering the measurement channel 104 to reduce the velocity of the process fluid as it enters the measurement channel to sub-critical flow. If the process fluid is already flowing at sub-critical flow the baffles 106 may have a limited effect on the fluid velocity. By reducing process fluid velocity to sub-critical flow, level measurement by the level measuring system 108 is more accurate as a given change in the volumetric flow rate of the process fluid has a more pronounced effect on the level of the process fluid flow in the measurement channel 104 than would be the case in critical or supercritical flow states. In applications where there is non-negligible entrainment of a vapor phase in the process fluid the baffles 106 may further reduce the entrained vapor phase by breaking up at least some of the bubbles or froth in the process fluid flow thereby leading to more accurate flow measurement by the level measuring system 108.

Various geometries of the baffles 106 is contemplated and is discussed below with reference to FIGS. 4*a* and 4*b*. In FIG. 1 the connection between the measurement channel 104 and the baffles is by a set of bolts or pins 112,114. In one embodiment, the set of baffles 106 has a slot to receive the bolts 112,114, allowing for the baffles to be selectively adjusted up and down and thereby selectively adjust level of baffling of the process fluid. If an alternative baffle arrangement is desired the bolts 112,114 can be unscrewed and the baffles 104 can replaced with an alternative set of baffles fixed by the rethreading the bolts through the measurement channel 104 and the alternative baffles. In certain embodiments the conditioning plates on the baffles may be adjustable, such as by a set screw adapted to fix the conditioning plates at given angles relative to the flow of process fluid so that a varied amount of baffling can occur based on process conditions and desired flow conditions in the measurement channel 104.

The measurement channel 104 receives the process fluid from the collection trough 102. In FIG. 1, a portion 102*a* of the collection trough 102 mates with a portion 104*a* of the measurement channel 104 and the portions 102*a*, 104*a* are secured by the bolts 112,114. Other connections are possible between the collection trough 102 and the measurement channel 104 provided that such connection permits process fluid to be substantially conveyed from the collection trough to the measurement channel. For example, the collection trough 102 may include a piece a rubber that seals against the measurement channel 104 when the portions 102*a*, 104*a* are pressed together.

The measurement channel 104 incudes a spray deflector plate 112. In many process environments there may be a certain amount of entrained liquid in the air proximal to the apparatus 100. If that entrained liquid contacts the level measuring system 108 and/or the signal used to measure the level of the process fluid in the measurement channel 104, the level measuring system could report an inaccurate measurement. The spray plate shields the level measuring system 108 and thereby reduces the chance of inaccurate measurement. In an alternative embodiment the measurement channel 104 may include a second collection trough that collects entrained process liquids in the air and returns those liquids to the collection trough 102.

The measurement channel 104 has a bottom 104*b* at a substantially consistent angle with ground. Consistency in the angle of the bottom 104*b* of the measurement channel 104 contributes to stabilization of process fluid flow and to accurate depth measurement by the level measuring system 108. The bottom 104*b* may be any shape, such as a U-shape, a V-shape or flat. The measurement channel 104 may be substantially any shape including a Parshall flume. In certain embodiments the measurement channel 104 may accept an insert to vary the shape of the measurement channel interfacing with the process fluid. For example, if reduced fluid flow is experienced from a unit process an insert may by placed inside the measurement channel 104 to decrease the effective cross-sectional area of the measurement channel thereby leading to more accurate measurement of the reduced process fluid flow.

In a preferred embodiment the action of the baffles 106 and the angle and shape of the measurement channel 104 cooperate to ensure that there is sub-critical flow in the measurement channel but that the flow of the process fluid is not so slow so as to effect unacceptable sedimentation of debris in the measurement channel.

In certain embodiments the angle of the measurement channel 104 relative to ground can be adjusted. For example, in FIG. 1 the bolts 112, 114 may be loosened and the angle of the measurement channel 104 relative to ground may be adjusted. The bolts 112,114 can be retightened when the measurement channel 104 is at the desired angle relative to ground.

The level measuring system 108 is connected to the measurement channel 104 downstream of the baffles 106. The level measuring system 108 sends and receives signals 108*a* through the process fluid moving through the measurement channel 104 in order to determine the depth of the process fluid. As will be described below with reference to FIG. 6, the depth of the process fluid in the measurement channel 104 at a defined angle of the measurement channel relative to ground can be used in a correlation algorithm to infer the mass or volumetric flow rate of the process fluid through the measurement channel.

The level measuring system 108 shown in FIG. 1 is a radar measuring system and its operation would be familiar to a skilled person. However, various level measuring systems may be used with the measurement channel 104. Other possible level measuring systems include one or more of an ultrasonic level measuring system, a capacitance level measuring system, a differential pressure level measuring system or a camera-based level measuring system, or any other measuring system that can reliably provide a level measurement of sub-critical process fluid flow in the measuring channel 104. In one embodiment one level measuring system, such as a radar measuring system, could be used to calibrate or train another level measuring system, such as a camera-based level measuring system. Once the camera-based level measuring system is sufficiently calibrated or trained the radar measuring system could be removed and used for other purposes.

In FIG. 1, the level measuring system 108 has two anchor posts 116*a*, 116*b* and two lifting posts 118*a*, 118*b* connected to support brackets 124*a*, 124*b* by set screws, and a detector 120 connected to the support brackets by set screws 120*a*, 120*b*. The anchor posts 116*a*, 116*b* may be used to bear against a part of the unit process in order to aid in setting the angle of the measurement channel 104 relative to ground and/or stabilizing the measurement channel. The lifting posts 118*a*, 118*b* may be used to aid in manipulating the apparatus 100. For example, by lifting the lifting posts 118*a*, 118*b* the apparatus 100 may be removed from connection with the unit process. The detector 120 sends signals through the process fluid flowing in the measurement channel 104. A height of the detector 120 relative to the measurement channel 104 is adjustable by loosening the set screws 120*a*, 120*b*, sliding the detector along the support brackets 124*a*, 124*b*, and retightening the set screws when the detector is at an appropriate height.

Figure 4B:
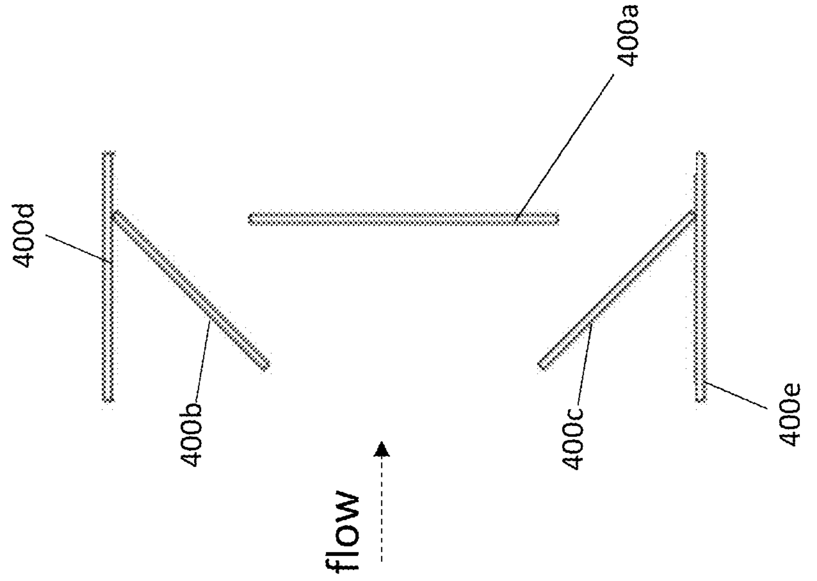
FIG. 4*b* is a top view of a cross section of the set of baffles of FIG. 4*a* along cut line 4*b*.
Figure 4A:
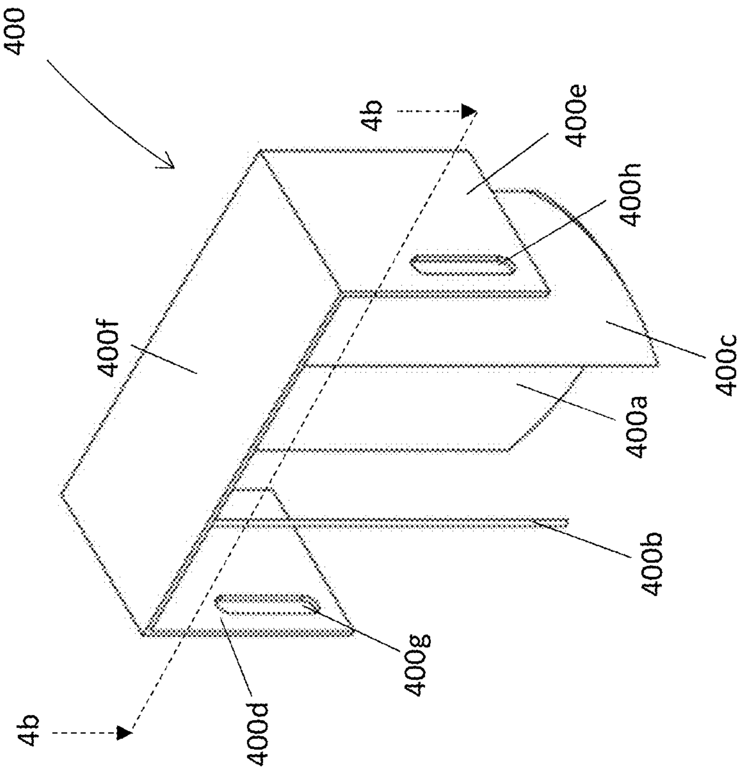
FIG. 4*a* shows an elevation view of a set of baffles, according to one embodiment.

Turning now to FIGS. 4*a* and 4*b*, FIG. 4*a* is an elevation view of a set of baffles 400 and FIG. 4*b* is a top view of a cross section of the set of baffles 400 along cut line 4*b*. Baffles 400 includes a main conditioning plate 400*a* and two side conditioning plates 400*b*, 400*c*. In operation, the three conditioning plates 400*a*,400*b*,400*c* impinge on the process fluid flow to slow the process fluid entering the measurement channel to sub-critical flow. The conditioning plates 400*a*, 400*b*,400*c* can take various geometries and arrangements, for example, including rounded or triangular conditioning plates. Sidewalls 400*d*,400*e* and top plate 400*f* provide structure to the baffles 400 to reduce deformation when the baffles are exposed to fluid flow. Because of the direction of flow of the process fluid relative to the baffles 400 as shown in FIG. 4B, the sidewalls 400*d*,400*e* may receive a relatively large portion of the fluid momentum as that fluid flow is deflected by the conditioning plates 400*b*,400*c* into the sidewalls. Slots 400*g*,400*h* are present in the sidewalls 400*d*,400*e*. As described above, the slots 400*g*,400*h* receive bolts to connect the baffles 400 to the measurement channel. The slots 400*g*,400*h* enable the baffles 400 to be raised or lowered relative to the fluid flow to increase or decrease baffling as may be required to achieve optimal sub-critical flow.

Figure 5:
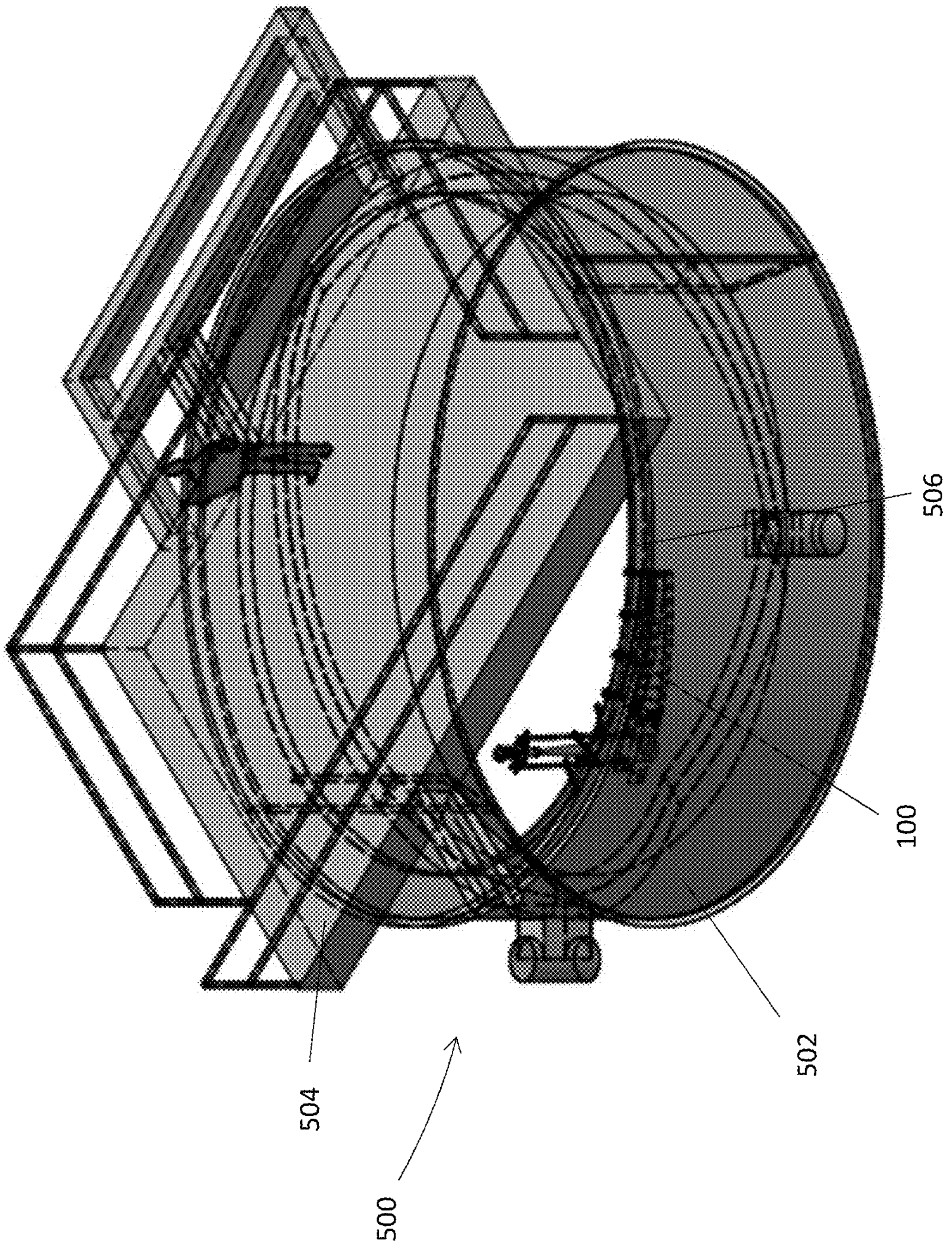
FIG. 5 shows an elevation view of an apparatus described herein connected to a tank cell, according to one embodiment.

Showing additional context for an application of the apparatus described herein, FIG. 5 shows an elevation view of the apparatus 100 connected to a tank cell 500. The tank cell 500 includes a viewing platform 504 and a flotation cell 502. When the flotation cell 502 is in operation process fluid flows over an edge 506 of the flotation cell and is collected by the apparatus 100. The mass or volumetric flow of the process fluid may be determined as described with reference to FIG. 6.

Figure 6:
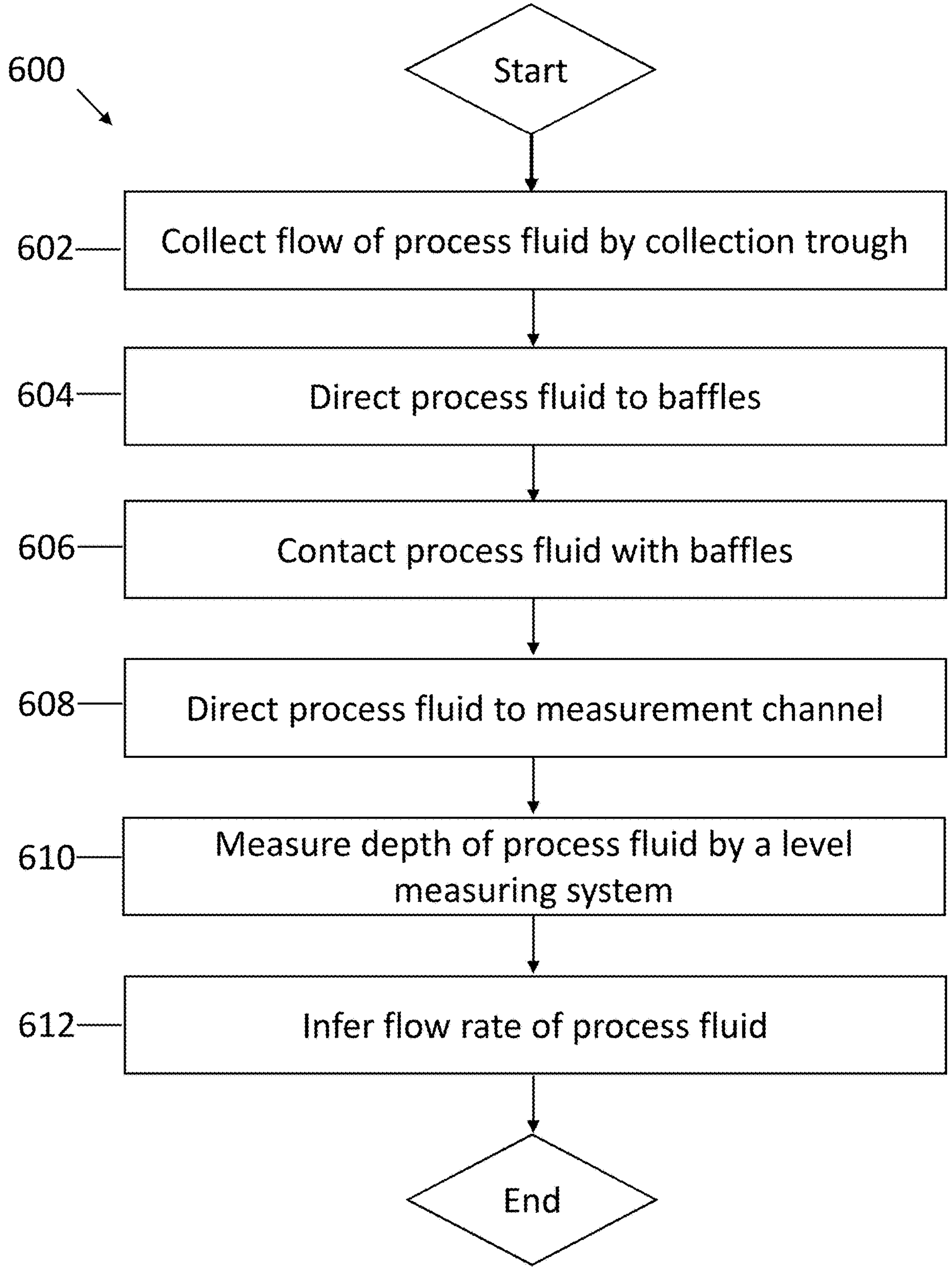
FIG. 6 is a flow chart of a method of measuring open channel flow of a process fluid, according to one embodiment.

Turning now to methods associated with the apparatus described herein, FIG. 6 is a flow chart of a method of measuring open channel flow of a process fluid, according to one embodiment. FIG. 6 includes, at step 602 collecting a flow of the process fluid from a unit process by a collection trough; at step 604, directing the process fluid to one or more baffles; at step 606, contacting the process fluid with the one or more baffles to reduce the velocity of the process fluid to sub-critical flow; at step 608, directing the process fluid to a measurement channel; at step 610, measuring the depth of the process fluid in the measurement channel by a level measuring system; and at step 612 inferring the flow rate of the process fluid by a correlation algorithm using the depth of the process fluid in the measurement channel and an angle of the bottom of the measurement channel relative to ground.

Steps 602 through 610 may be implemented using the exemplary apparatus 100 as described herein or by various alternatives discussed above.

At step 612 the process fluid level in the measurement channel is converted to an inferred volumetric flow by a correlation algorithm.

Various correlation algorithms would be known by the skilled person. The correlation algorithm may be empirically or theoretically determined and depend on the process fluid characteristics and composition. However, in general, the correlation algorithms relevant to the present disclosure infer the flow rate of a process fluid from the depth of fluid flow at a given angle and process fluid conditions or parameters. By way of illustrative example only, if the process fluid were water then at sub-critical flow conditions the Manning formula may be used to provide the fluid flow rate. With SI unit the Manning formula is given as:

$$Q = vA = \frac{kAR^{2/3}S^{1/2}}{n}$$

where Q is the flow rate ($m^3$/s); v is the mean fluid velocity (m/s); A is the cross-sectional flow area ($m^2$); k=1.00 in SI units; R is the hydraulic radius (i.e. the cross-sectional area divided by wetted perimeter) in m; S is the slope of the channel at the point of measurement in rise/run m/m; and n is the Manning's roughness coefficient. Each of these variables would either be known or can be calculated from the angle and geometry of the measurement channel as described herein and the depth of the fluid flow in that measurement channel. The derived volumetric flow rate can be converted to mass flow rate if the density of the process fluid in the measurement channel can be reliably determined.

The described apparatuses and methods also lend themselves to various method to assess and/or improved the reliability of the inferred flow rate. For example, the angle of the measurement channel could be adjusted from a first angle relative to ground to a second angle relative to ground. Assuming that the measurements and assumed constants are accurate, a skilled person would expect relatively little discrepancy between the two measured process flow rates. If desired, the inferred flow rate could be compared against an established flow rate determined by collecting the process fluid flow through the measurement channel for a given time. If the inferred flow rate differs from the measured flow rate it may be possible to revise the constant flow properties, such as the Manning roughness, to obtain a more accurate inferred flow rate.

By measuring the process fluid flow rates through open channels it becomes possible to optimize the process fluid flow rate from a unit process. Various techniques, such as integrated quadratic control, may be used to strategically allocate the desired flow rate set-points of several flotation cells in series thus, where appropriate, ensuring that the first cells in the series contribute more flow than the last cells in the series to achieve a finite allowed total flow rate.

Many further modifications will readily occur to those skilled in the art to which the invention relates and the specific embodiments herein described should be taken as illustrative of the invention only and not as limiting its scope as defined in accordance with the accompanying claims.

We claim:

1. An apparatus for supporting inferential measurement of open channel flow of a process fluid, the apparatus comprising:

a collection trough adapted to receive the process fluid from a unit process;

a measurement channel adapted to receive the process fluid from the collection trough, the measurement channel having a bottom at a consistent angle with ground;

one or more baffles connected to the measurement channel, the one or more baffles adapted to adjust the velocity of the process fluid to sub-critical flow; and a level measuring system connected to the measurement channel downstream of the one or more baffles, the level measuring system adapted to send and receive one or more signals through the process fluid in the measurement channel to determine the depth of the process fluid.

2. The apparatus of claim 1, wherein the collection trough is curved, and the collection trough comprises clips and/or hooks to removably connect the collection trough to an edge of the unit process.

3. The apparatus of claim 1, wherein an angle of the measurement channel relative to ground is selectively adjustable by a pin connecting the measurement channel to the collection trough.

4. The apparatus of claim 1, wherein the bottom of the measurement channel is generally shaped as any one of: a U-shape, a V-shape; or flat.

5. The apparatus of claim 1, wherein the measurement channel is shaped as a Parshall flume.

6. The apparatus of claim 1, the measurement channel comprising a spray deflector plate.

7. The apparatus of claim 1, the apparatus further comprising a second collection trough adapted to shield the level measuring system from spray from the unit process and collect and return the spray to the collection trough.

8. The apparatus of claim 1, wherein the shape of the measurement channel is selectively adjustable by an insert adapted to fit in the measurement channel.

9. The apparatus of claim 1, wherein the baffles are removably connected to the measurement channel.

10. The apparatus of claim 1, wherein an angle of the one or more baffles is adjustable relative to the process fluid.

11. The apparatus of claim 1, wherein the level measuring system is any one of: a radar level measuring system; an ultrasonic level measuring system; a capacitance level measuring system; or a camera-based level measuring system.

12. The apparatus of claim 1, wherein the level measuring system comprises a detector adapted to send and receive the one or more signals, the detector being selectively connected to one or more support brackets fixed to the measurement channel so as to permit adjustment of a height of the detector relative to the measurement channel.

13. The apparatus of claim 1, the apparatus further comprising one or more anchor posts connected to the level measuring system.

14. The apparatus of claim 1, the apparatus further comprising one or more lifting posts connected to the level measuring system.

15. A method of measuring open channel flow of a process fluid, the method comprising the steps of:
- collecting a flow of the process fluid from a unit process by a collection trough;
- directing the process fluid to one or more baffles;
- contacting the process fluid with the one or more baffles to reduce the velocity of the process fluid to sub-critical flow;
- directing the process fluid to a measurement channel;
- measuring the depth of the process fluid in the measurement channel by a level measuring system; and
- inferring the flow rate of the process fluid by a correlation algorithm using the depth of the process fluid in the measurement channel and an angle of the bottom of the measurement channel relative to ground.

16. The method according to claim 15, the method further comprising the steps of:
- manually measuring the flow rate of the process fluid in the measurement channel;
- adjusting one or more parameters of the correlation algorithm so that the inferred flow rate of the process fluid more closely approximates the manually measured flow rate of the process fluid.

17. The method according to claim 15, the method further comprising the steps of:
- adjusting the angle of the measurement channel relative to ground to a second angle;
- measuring a second depth of the process fluid by the level measuring system;
- inferring a second flow rate of the process fluid by the correlation algorithm using the second depth of the process fluid in the measurement channel;
- comparing the inferred flow rates.

18. The method according to claim 15, the method further comprising the step of:
- using the inferred flow rate in a process control system to control one or more other process variables.

* * * * *